April 21, 1964  R. T. GALLOWAY  3,130,385
APPARATUS FOR DETERMINING THE DIRECTION
OF ARRIVAL OF WAVE ENERGY
Filed Aug. 25, 1961  2 Sheets-Sheet 1

RICHARD T. GALLOWAY
INVENTOR.

BY

ATTORNEYS

RICHARD T. GALLOWAY
INVENTOR.

United States Patent Office 3,130,385
Patented Apr. 21, 1964

3,130,385
APPARATUS FOR DETERMINING THE DIRECTION OF ARRIVAL OF WAVE ENERGY
Richard T. Galloway, Panama City, Fla., assignor to the United States of America as represented by the Secretary of the Navy
Filed Aug. 25, 1961, Ser. No. 136,132
3 Claims. (Cl. 340—6)
(Granted under Title 35, U.S. Code (1952), sec. 266)

The invention described herein may be manufactured and used by or for the Government of the United States of America for governmental purposes without the payment of any royalties thereon or therefor.

The present invention relates to position determining systems and more particularly to means for determining the direction of arrival of wave energy from a known source. While the invention may be utilized in connection with any form of wave energy, it is particularly feasible to make use of acoustic wave energy and the invention will be disclosed as embodied in a navigation system using underwater sonic markers.

In the navigation art, it has long been known that submarine acoustic signals originating from known points under water can be utilized by suitable instrumentation aboard ship to enable a navigator to plot his course with respect to such markers. An early example of such knowledge is Patent No. 684,706, October 15, 1901, to Mundy. A more recent example is Patent No. 2,366,800 January 9, 1945, to Norrman. In each of these patents, the transit time of the sound through the water is measured to determine the distances to the respective markers and by triangulation methods the vessel's position can be determined. It is also known to determine the direction of arrival of sound energy by noting the phase relation between the impingement of a wave front on two spaced sound responsive devices such as hydrophones. An example of such a direction finding system is shown in Patent No. 2,166,991, July 25, 1939, to Guanella.

One feature of the present invention eliminates the ambiguities present in a high frequency phase comparison system and greatly improves accuracy over a low frequency phase comparison system. Stated conversely, the direction finding system of the invention utilizes sonic markers which transmit sine wave amplitude modulated carrier frequencies in conjunction with a receiving system which provides the accuracy obtainable from high frequencies and the absence of ambiguities obtainable by low frequencies. Accordingly, an object of the invention is to provide a direction finding system which furnishes answers which are definitive, i.e., accurate and unquestionable.

Another object of the invention is to provide apparatus which in cooperation with special markers will provide bearing information from which position can be determined and plotted or otherwise employed as a navigation aid.

In accordance with the invention as embodied in a navigation system, two acoustic markers are anchored near the the bottom at two fixed points in known orientation with respect to a desired course and preferably located an equal distance to each side of the desired course. Each of the acoustic markers transmits into the water a unique carrier frequency of say about 50–100 kc., amplitude modulated by a sine wave of relatively low frequency of say 500–10,000 c.p.s., the modulating frequency preferably being the same for both markers. The shipboard equipment for cooperating with these markers may comprise two arrays consisting of two hydrophones each, mounted for independent rotation about the same vertical axis on a hull mount which contains preamplifiers for each hydrophone. The two arrays of hydrophones form parts of two receiver means selectively responsive to the different transmitted carrier frequencies. Each of the receiver means separates the incoming signal into its carrier and modulation frequencies, compares the phases of each frequency from one hydrophone with corresponding frequency phases of the other hydrophone in the array and derives a current therefrom which is zero only when the array is oriented broadside to its cooperating marker. This derived current, which is highly sensitive to a change in orientation of the array and reverses direction of flow at the point of balance, is used to rotate the array orientation in a direction to reduce the current and thus maintain the array in its broadside orientation. It is noted that both frequencies are required to produce this result for, if the hydrophone array is of reasonable size, the current derived from the high frequency alone would produce many ambiguities since it would pass through zero at small intervals of array rotation while the low frequency alone could provide a system with no ambiguities but its accuracy would be intolerable. Proper operation is assured when the two hydrophones in the array are separated by a distance substantially equal to one-half the wave length in water of the modulation frequency of the received signal.

The invention itself as well as other objects and advantages thereof will be understood by one skilled in the art from the following description when read in connection with the accompanying drawings in which.

Figure 1:
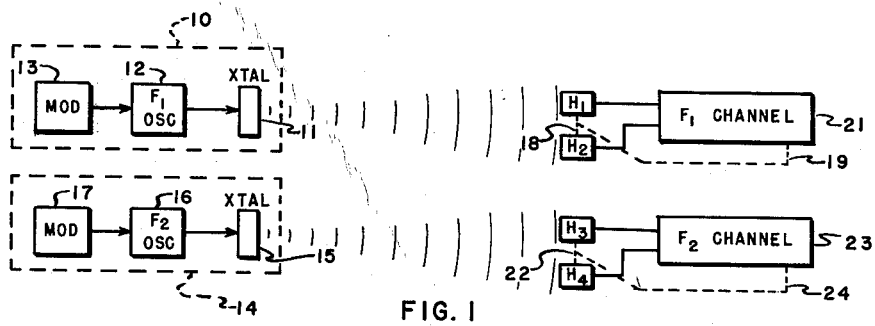
FIG. 1 is a functional diagram illustrating sonic receiving and position indicating means cooperating with a pair of sonic markers.

As shown in FIG. 1, a sonic marker 10 has a crystal transducer 11 submerged in water and arranged to be electrically excited by an oscillator 12 suited to generate a carrier frequency $F_1$ and with which is associated a modulator 13 for sinusoidally varying the amplitude of the generated carrier frequency. Another sonic marker 14 is also provided with its crystal 15 submerged in water and arranged to be electrically excited by an oscillator 16 to generate a carrier frequency $F_2$ and with which is associated a sine wave generator 17 for modulating the amplitude of the carrier frequency. It will be understood that in an exemplary use the sonic markers 10 and 14 are placed at known positions with respect to a ship channel or other desired course to be followed by a vessel. The position finding apparatus carried by the vessel comprises a pair of receiver means, each of which includes two spaced hydrophones, connected to a signal processing channel individually responsive to a separate carrier frequency transmitted by the markers 10 and 14. As viewed in FIG. 1, the upper receiver means comprises two hydrophones $H_1$ and $H_2$ mounted in spaced relation on a support 18 mounted to be rotated about a vertical axis by a shaft 19. The signal outputs of the hydrophones $H_1$ and $H_2$ are fed to a processing channel 21 which is selectively responsive to the carrier frequency $F_1$. As will be hereinafter described in detail, the channel 21 senses the phase relation between the signals coming from the hydrophones $H_1$ and $H_2$ and derives a current representative thereof which through a motor means turns the shaft 19 to rotate the hydrophone assembly $H_1$ and $H_2$ in a direction to place them broadside, i.e., parallel, to the incident sound wave, at which time the current derived in the channel 21 is substantially zero. In a similar manner, the signal of frequency $F_2$ is received by the hydrophones $H_3$ and $H_4$ spaced on a support 22, which is preferably rotatable about the same vertical axis as the support 18. A channel 23 processes the $F_2$ frequency signal to rotate a shaft 24 in a direction to orient the hydrophones $H_3$ and $H_4$ broadside to the incoming $F_2$ frequency carrier. It will be evident from the foregoing that the positions of the shafts 19 and 24 represent the respective bearings of their cooperating markers 10 and 14 and that by suitable servo systems the shaft positions can be converted to steering information, course plotting and the like.

The sonic markers 10 and 14 may be continuously transmitting but when they are battery powered they preferably are arranged to transmit a portion of the total elapsed time, say 3 seconds out of each ten second interval, so as to prolong battery life but still permit readings being taken at reasonably frequent intervals.

Figure 2:
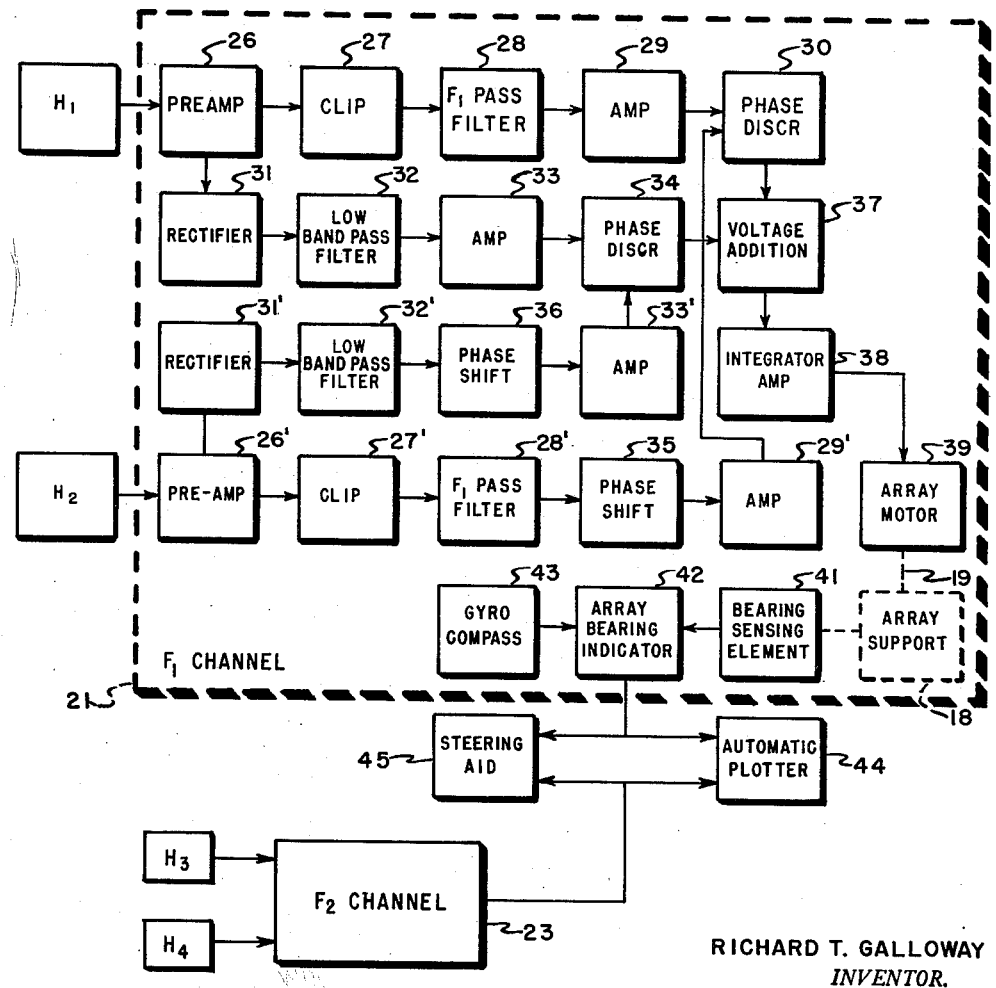
FIG. 2 is a schematic block diagram illustrating the direction finding sonic receiver circuits of the invention.

As shown in FIG. 2, the signal from the hydrophone $H_1$ is passed through a preamplifier 26, a clipper 27, a high band pass filter 28 which removes all but the carrier frequency $F_1$ and through an amplifier 29 to one input of a phase discriminator 30. The signal from the preamplifier 26 is also fed through a rectifier 31, a low band pass filter 32 for the modulating frequency of the signal and then through an amplifier 33 to an input of another phase discriminator 34. The signal output from the hydrophone $H_2$ is similarly processed, like components being designated by primed reference characters, with the difference that the carrier frequency and the modulation frequency are shifted 90° in phase by phase shifters 35 and 36, respectively, to satisfy the input requirements of the phase discriminators 30 and 34. The outputs of the phase discriminators 30 and 34 are combined in a voltage adder 37 and passed through an integrating amplifier 38 to a motor 39 the shaft 19 of which controls the orientation of the hydrophone support 18, here indicated in phantom. The orientation of the hydrophone support 18 indicates the direction of the wave enery received by the hydrophones $H_1$ and $H_2$ and, as was indicated above, the position of the support 18 can by means of a bearing sensing element 41 actuate a bearing indicator 42 to provide relative bearing. True bearing may be obtained by coupling a gyro compass 43 to the indicator 42, as is well known. The true bearing information thus obtained from the $F_1$ channel can, with similar information obtained from the $F_2$ channel, be used to operate an automatic plotter 44 as well as any desired steering aid 45. It will be understood that the $F_2$ channel 23 is identical with the $F_1$ channel above described except that the high band pass filters 28 and 28' are selected to pass the $F_2$ carrier frequency.

The circuits employed in the phase discriminators 30 and 34, the voltage adder 37 and the integrating amplifier 38 will now be described in connection with FIG. 3.

Figure 3:
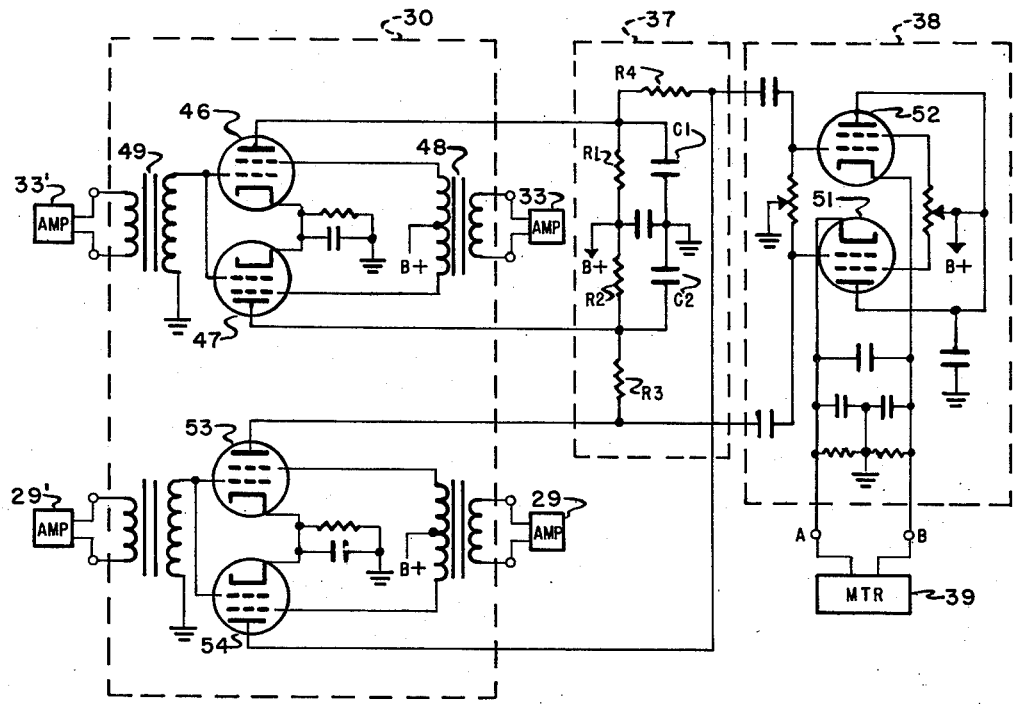
FIG. 3 is a schematic circuit diagram of the phase discriminators, voltage adder and integrator amplifier employed in the receiver circuits.
Figure 4:
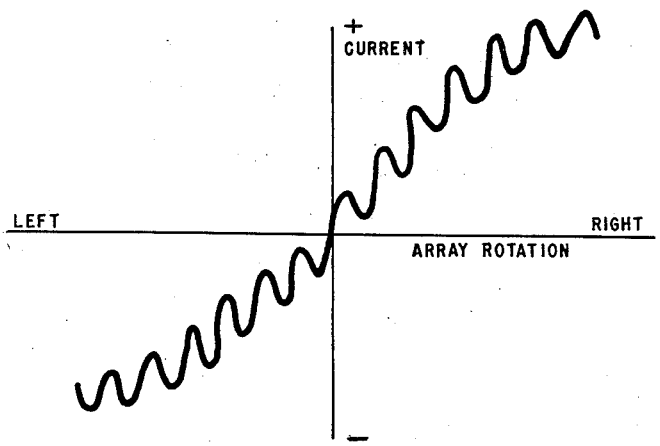
FIG. 4 illustrates graphically the current derived from a direction finding receiver.

As shown in FIG. 3, the low frequency signal from the amplifier 33 is applied to the screen grids of tubes 46 and 47 from opposite ends of a transformer 48 to assure 180° phase difference. The low frequency signal from the amplifier 33', which is shifted 90° in phase, is applied in phase to the control grids of the tubes 46 and 47 through a transformer 49. The signal on the control grids of the tubes 46 and 47 is 90° out of phase with both screen grid signals and, if the signals at the output of the hydrophones $H_1$ and $H_2$ are in phase, the plate currents of the tubes 46 and 47 will be identical and a balanced condition will exist indicating that the hydrophones $H_1$ and $H_2$ are oriented broadside to the cooperating sonic marker 10. If the hydrophone support 18 is slowly rotated with respect to the sound source, the phase of the signal at one hydrophone will be advanced while the phase of the signal at the other hydrophone will be retarded with the result that the screen and control grids of one of the tubes 46 and 47 will now have the same polarity a greater part of the cycle than the grids of the other tube. This condition causes an unbalance in the output of the two tubes 46 and 47. The signal output of the tubes 46 and 47 is primarily large pulses of current in their plate circuits at the times both of their respective grids are positive and, if, for example, the signal output of the tube 47 is increased, it appears at the control grid of a tube 51 in the integrating amplifier 38 as negative pulses which reduce the average plate and cathode current of the tube 51 thereby driving the cathode of the tube 51 less positive with reference to ground than the cathode of a tube 52, which is also in the amplifier 38, thereby producing an unbalance in the output circuit to the motor 39. This particular unbalance would cause current to flow in the motor 39 from terminal B to terminal A. If the large pulses of current appear in the plate circuit of the tube 46, the large negative pulses at the grid of the tube 52 reduces the plate and the cathode current of this tube thereby driving the cathode of this tube 52 less positive with reference to ground with a resulting current flow through the motor 39 from the terminal A to the terminal B. The high frequency signals from the amplifiers 29 and 29' are handled by tubes 53 and 54 in the same manner as above described for the low frequency signals. The outputs from the low and high frequency phase discriminators 34 and 30, respectively, are added by the network consisting of $R_1$, $R_2$, $R_3$, $R_4$, $C_1$ and $C_2$ and the combined signal is applied to the control grids of the tubes 51 and 52. It will be apparent that, if the high and low frequency signals are added in the correct proportion, the output current appearing on the terminals A and B will have the characteristics shown in FIG. 4, which makes possible precise direction finding.

The $F_2$ channel 23, processing the signals from the hydrophones $H_3$ and $H_4$, is identical to the $F_1$ channel 21, except for its high band pass filters, and functions to obtain the bearing of the second marker 14. Knowing the bearings of the two markers 10 and 14, accurate fixes are readily obtainable.

When bearing information alone is desired as where a vessel homes on a marker it will be evident that only one sonic marker need be employed and that only one receiver means is required. Also, it will be obvious that the sonic marker may be carried by a vessel the movement of which is to be observed by a stationary or moving receiver means as, for instance, in position indicating equipment for use in blind flying of towed gliders in the air or vehicles towed submerged in water. Inasmuch as the approximate range to a towed vehicle is known, its position can be determined by so mounting the two hydrophone arrays as to indicate, respectively, azimuth and elevation or declination, and only a marker of a single frequency is required. This being true it follows that only three hydrophones and their processing channels are needed since one hydrophone may be common to both arrays.

Although the invention has been described as applied to a particular position determining system utilizing sonic energy, it will be evident that direction finding apparatus of the invention and obvious modifications thereof are adapted to the use of other wave energy and to other applications and it is intended to include all such modifications within the scope of the appended claims.

What is claimed is:

1. In a system for charting the position of a vessel in a channel defined in a predetermined manner by two spaced underwater sonic transmitters which at least periodically transmit amplitude modulated sonic signals at different fixed carrier frequencies, vessel carried position finding apparatus including a pair of receiver means selectively responsive to a different one of said transmitted sonic signals, each of said receiver means including two spaced hydrophones mounted for rotation about a vertical axis, individual receiving channels for separating the modulation frequency and the carrier frequency signals produced, respectively, by each of said two hydrophones, means for deriving a first current representative of the phase relation between the two modulation frequency signals, means for deriving a second current representative of the phase relation between the two carrier frequency signals, and means responsive to said first and second currents for rotating said hydrophones until both of said currents are reduced to substantially zero, whereby the orientation of said hydrophones is indicative of the bearing of the cooperating sonic transmitter, and an indicator responsive to the orientations of the hydrophones in both of said receiver means.

2. The apparatus as claimed in claim 1 wherein the hydrophones in each of said receiver means are separated by a distance substantially equal to one-half the wave length in water of the modulation frequency of the sonic signal to which said receiver means is selectively responsive.

3. Apparatus for determining the direction of a source of high frequency wave energy amplitude modulated by a low frequency sine wave, comprising a pair of spaced transducers rotatable in assembly about an axis transverse to the line defined by said transducers, means for combining the high frequency outputs of said transducers to produce a first electric signal proportional to the phase difference between the high frequency wave at said transducers, means for combining the low frequency outputs of said transducers to produce a second electric signal proportional to the angular displacement between the source of wave energy and the plane of symmetry of said transducers, means for additively combining said first and said second electric signals to produce a third electric signal, and means governed by said third electric signal to rotate said transducers in assembly until said third electric signal assumes a minimum value.

References Cited in the file of this patent

UNITED STATES PATENTS

| | | |
|---|---|---|
| 2,349,370 | Orner | May 23, 1944 |
| 2,366,800 | Norrman | Jan. 9, 1945 |
| 2,422,446 | Stuart | June 17, 1947 |
| 2,530,528 | Kreer | Nov. 21, 1950 |
| 2,598,290 | O'Brien | May 27, 1952 |